MEASUREMENT AND SIMULATION OF TRANSFER PARAMETERS

Filed Aug. 3, 1953

BY

INVENTOR
G. RAISBECK

N. S. Ewing

ATTORNEY.

2,907,950

MEASUREMENT AND SIMULATION OF TRANSFER PARAMETERS

Gordon Raisbeck, Basking Ridge, N.J., assignor to Bell Telephone Laboratories, Incorporated, New York, N.Y., a corporation of New York Application August 3, 1953, Serial No. 371,771

9 Claims. (Cl. 324—57)

This invention relates to circuits and methods for obtaining a two-terminal equivalent of a transfer parameter which involves current and voltage at different terminals in a network or device.

Four-pole parameters such as transfer impedance or admittance, and voltage or current gain, involve currents or voltages appearing at different terminals of the four-pole. (The term "four-pole" is used herein to indicate a four-terminal transducer—a network or device—with two pairs of accessible terminals.) Direct measurements of these currents or voltages to determine a desired parameter encounter difficulty where a phase angle is involved, particularly at high frequencies. In accordance with an illustrative embodiment of the present invention described in more detail below, these difficulties are minimized by transferring the currents or voltages to a single pair of terminals so that there appears at this pair of terminals an impedance or admittance directly related in magnitude and having the same phase angle as the desired parameter. The techniques described will also permit obtaining as a two-terminal driving-point impedance or admittance the transfer impedance or admittance of any network, active or passive.

An object of the invention is to obtain at a single pair of terminals the transfer impedance or admittance of any network or translating device.

Another object of the invention is to determine the transfer impedance or admittance of a network or translating device by a single ratio measurement. A related object is to measure transfer impedance or admittance without the necessity of making accurate phase comparisons.

It is also an object of the invention to simplify current and voltage gain measurement.

These and other objects and features of the invention will be better understood from a consideration of the following detailed description when read in accordance with the attached drawings, in which.

Figures 1, 1A, 1B:
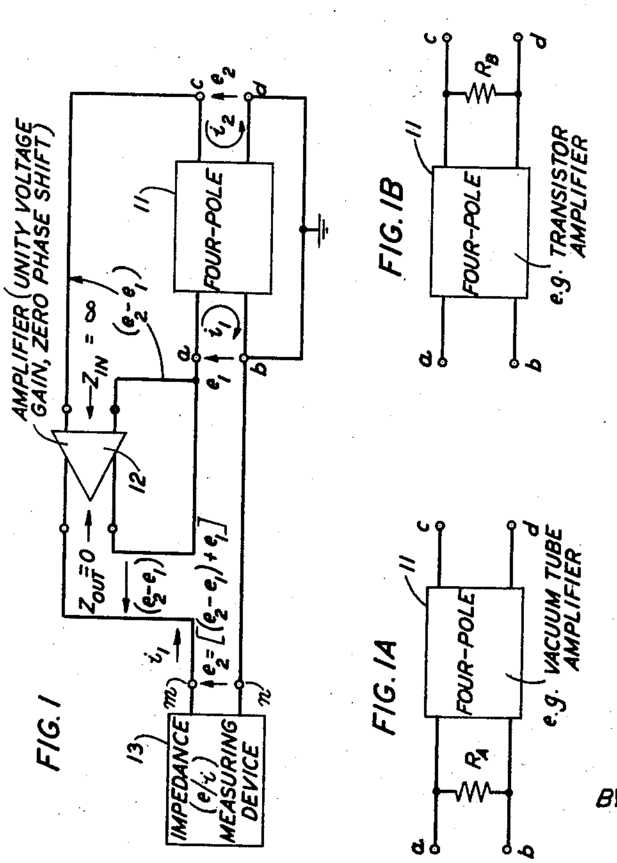
Fig. 1 represents, by a block schematic diagram, a circuit embodying principles of the invention for measuring the transfer impedance of any four-pole.
Figs. 1A and 1B illustrate modifications of the circuit of Fig. 1 for measuring the voltage or current gain, respectively, of a four-terminal device such as a vacuum tube or transistor amplifier.

Box 11 in Fig. 1 represents any four-pole, either network or device, active or passive, having a pair of input terminals *a*, *b*, and a pair of output terminals *c*, *d*. The incremental input and output terminal voltages and currents $e_1$, $i_1$ and $e_2$, $i_2$ are indicated in the figure. The circuit illustrated is adapted to measure the transfer impedance of the four-pole 11, the transfer impedance, $Z_t$, being defined as $$Z_t=\frac{e_2}{i_1}$$

A straightforward method of measuring transfer impedance would be to measure $e_2$ at the output terminals and $i_1$ at the input terminals. If a phase angle were involved, however, it would be difficult, particularly at high frequencies, to make an accurate phase comparison of $e_2$ and $i_1$. In accordance with the invention, however, the output terminal voltage $e_2$ is transferred, in proper phase, to a pair of terminals *m, n* at which $i_1$ appears and components of $e_1$ which would otherwise appear at this pair of terminals are cancelled out. A voltage equal to $e_2$ and a current equal to $i_1$ are therefore obtained in proper phase at a single pair of terminals so that the transfer impedance of the network, which appears at this pair of terminals as its two-terminal equivalent, may be obtained by a direct impedance measurement at terminals *m, n*.

An amplifier 12 having unity voltage gain and producing zero phase shift is employed to transfer $e_2$ to the pair of terminals *m, n*. One input terminal of the amplifier 12 is connected to an output terminal *c* of the four-pole, and the other input terminal is connected to an input terminal *a*. The input voltage of the amplifier 12 is, therefore, equal to $(e_2-e_1)$. Since the amplifier has a voltage gain of one and produces no phase shift, the voltage between the output terminals of the amplifier is also $(e_2-e_1)$ and of the same phase as the input voltage. The voltage at the auxiliary pair of terminals *m, n,* however, is the voltage between the output terminals of the amplifier less the input voltage of the four-pole, or $(e_2-e_1)+e_1$, so that the net voltage at these terminals is merely $e_2$.

The amplifier 12 also has an infinite input impedance and a zero output impedance. Therefore, $i_2$ is equal to zero and no current flows to the input of the amplifier. Further, since the current at the input terminals of the four-pole is $i_1$ and since the output impedance of the amplifier 12 is zero, the current at the auxiliary pair of terminals *m, n* is also equal to $i_1$. The impedance looking in at this pair of terminals is, therefore, equal to $$\frac{e_2}{i_1}$$

which is the transfer impedance of the four-pole and may be measured by any impedance or voltage-current ratio measuring device 13 such as a standard impedance bridge.

Figures 2, 4:
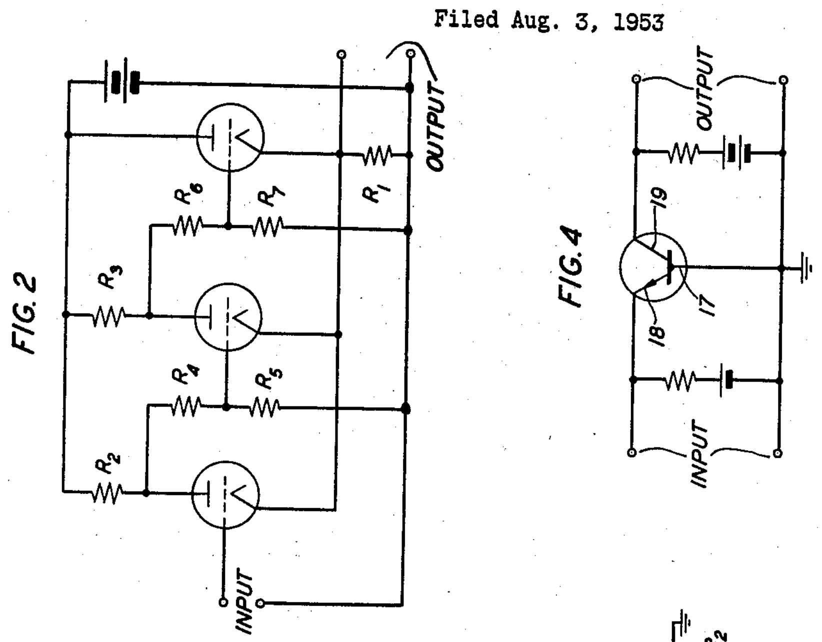
Fig. 2 illustrates schematically an amplifier which may be used in the circuit illustrated by Fig. 1.
Fig. 4 illustrates an amplifier which may be employed in the Fig. 3 circuit.

As a first approximation, a conventional cathode follower will satisfy the requirements of the amplifier 12 since it has a voltage gain of approximately one, a high input impedance, a low output impedance, and produces no phase shift in the input signal. Well-known modifications of cathode follower circuits involving, for example, several cathode followers will more nearly approximate the requirements of this amplifier. An example of such an amplifier is illustrated in Fig. 2. This amplifier comprises a three-stage direct-current coupled amplifier connected as a cathode follower. The common cathode resistor $R_1$ provides 100 percent negative feedback from the third to the first stage. The main function of the intermediate stage is to provide a phase reversal for the input to the third stage so that the feedback is negative and so that the ouput is of the same phase as the input. Because of the feedback, the input impedance will be very high. The output impedance can be made very low, in fact, can be made to approach $$\frac{r_p}{\mu_1\mu_2\mu_3}$$

where $r_p$ is the plate resistance of the final stage and $\mu_1$, $\mu_2$, and $\mu_3$ are the amplification factors of the first, second, and third stages, respectively. Following are suggested values for the various resistors: $R_1$, 3,300 ohms; $R_2$ and $R_3$, 9,000 ohms each; and $R_4$–$R_7$, 100,000 ohms each; for B+, 300 volts is suggested.

With the modification illustrated in Fig. 1A, the Fig. 1 circuit may be used to measure voltage gain, for example, of a vacuum tube amplifier. With this modification, the input terminals $a$, $b$ of the four-pole are terminated in a resistor $R_A$ of low value relative to the input impedance of the four-pole. The input current $i_1$ will therefore be approximately equal to $$\frac{e_1}{R_A}$$

so that the ratio measured by the impedance measuring device will equal $$R_A\left(\frac{e_2}{e_1}\right)$$

or, $R_A$ times the voltage gain of the vacuum tube amplifier under test. By way of example, $R_A$ may be made a power of ten so that the voltage gain may be quickly determined.

With the modification illustrated in Fig. 1B, the current gain of a device such as a transistor amplifier can be measured. With this modification, the output terminals $c$, $d$ of the four-pole are terminated in a resistor $R_B$ of low value relative to the output impedance of the four-pole. Therefore, $$e_2 = i_2 R_B$$

and the ratio measured by the impedance measuring set will equal $$R_B\left(\frac{i_2}{i_1}\right)$$

or, $R_B$ times the current gain of the device under test.

Figure 3:
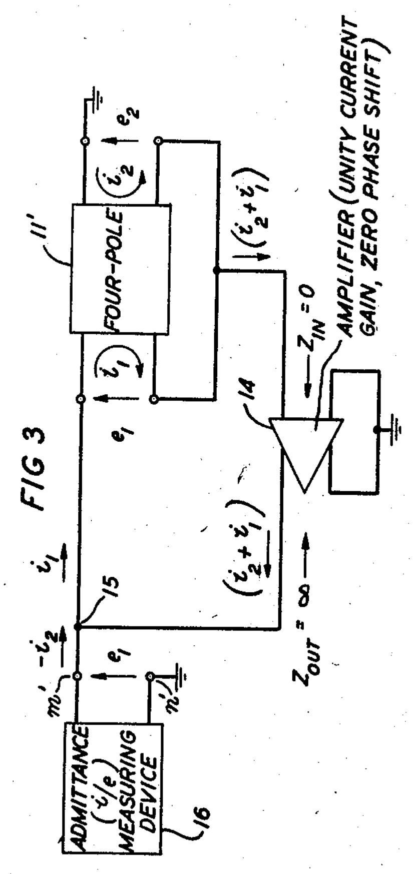
Fig. 3 illustrates by block schematic diagram a circuit for measuring the transfer admittance of a four-pole; this circuit is the dual of the Fig. 1 circuit.

The dual of the circuit illustrated in Fig. 1 will, in a similar manner, present the transfer admittance $$\frac{-i_2}{e_1}$$

of a four-pole at a pair of terminals $m'$, $n'$. (For principles of duality, see "Duality as a Guide in Transistor Design," by R. L. Wallace and G. Raisbeck, 30 Bell System Technical Journal 381, April 1951.) The circuit illustrated in Fig. 3 is, in fact, the dual of the Fig. 1 circuit. In accordance with duality principles, a current $i_2$ is fed back and combined with a current $i_1$ in such a manner that a net current of $-i_2$ will appear at terminals $m'$, $n'$ between which the voltage is $e_1$. The ideal feedback amplifier 14 in this case is a current amplifier having unity current gain, zero input impedance, infinite output impedance, and producing a zero phase shift. The input current of the amplifier is, from the manner of connection, $i_2+i_1$ and the amplifier output $i_2+i_1$. At point 15, $+i_1$ combines with $i_2+i_1$ to leave a net current of $-i_2$ as indicated. Since the voltage at terminals $m'$, $n'$ is the same as the input terminal voltage $e_1$ of the four-pole, the transfer admittance $$\frac{-i_2}{e_1}$$

appears at these terminals and may be measured by an admittance measuring device 16 which measures the reciprocal of the voltage-current ratio.

An n-p-n transistor 17 in grounded base configuration, as illustrated in Fig. 4, substantially satisfies the requirements of the amplifier in Fig. 3. A detailed description of such an amplifier is given in "Some Circuit Properties and Applications of n-p-n Transistors," by R. L.

Wallace and W. J. Pietenpol, 39 Proc. I.R.E. 753, July 1951. A typical amplifier of this type has approximately unity current gain, an input impedance of a few hundred ohms, an output impedance of one or more megohms, and produces no phase shift between the emitter electrode 18 and collector electrode 19.

Although the circuit illustrated in Fig. 1 is adapted for measuring transfer impedance, it should be realized that these techniques are broadly applicable for realizing at a pair of terminals such as the terminals $m$, $n$ a two-terminal impedance equal to the transfer impedance of any active or passive network, such as an amplifier, filter, etc. Since a transfer impedance can be made negative merely by reversing the phase of either the input current or the output voltage of the four-pole, the impedance at this pair of terminals can therefore be easily made to equal the negative of the transfer impedance of the network. The circuit illustrated in Fig. 3 is, likewise, not restricted to measuring. Other modifications and embodiments will readily occur to one skilled in the art so that the invention should not be deemed limited to the embodiments specifically shown and described.

What is claimed is:

1. In combination, an amplifying device having a pair of input terminals and a pair of output terminals, means comprising an energy source, means for connecting said source to said input terminals, a unity voltage gain amplifier having a very high input impedance, a very low output impedance, and producing a substantially zero phase shift between input and output, said amplifier also having a pair of input terminals and a pair of output terminals, means for connecting one of the input terminals of said amplifier to one of the output terminals of said amplifying device, means for connecting the other input terminal of said amplifier to one of the input terminals of said amplifying device, means for connecting the output of said amplifier in series with said source and the input of said amplifying device, and a resistor of relatively low value connected across one of the pairs of terminals of said amplifying device.

2. In combination, a source of voltage, a four-pole, means for applying said voltage to a first pair of terminals of said four-pole whereby a voltage $e_1$ and current $i_1$ appear at said first pair of terminals and a voltage $e_2$ and a current $i_2$ appear at a second pair of terminals of said four-pole, a low impedance termination connected across one of said pairs of terminals, an auxiliary pair of terminals, means for transferring the current $i_1$ and the voltage $e_1$ to said auxiliary pair of terminals, means for deriving the difference voltage $e_2$ minus $e_1$, means for transferring said difference voltage to said auxiliary pair of terminals, said current $i_1$ thereby being manifest at said auxiliary terminals and the net voltage thereacross being said voltage $e_2$, and means connected to said auxiliary pair of terminals and responsive to said quantities $i_1$ and $e_2$.

3. Apparatus for measuring the voltage gain of an amplifying device which comprises the combination in accordance with claim 2 wherein said four-pole comprises said amplifying device and wherein said low impedance termination is connected across the input terminals of said amplifying device.

4. Apparatus for measuring the current gain of an amplifying device which comprises the combination in accordance with claim 2 wherein said four-pole comprises said amplifying device and wherein said low impedance termination is connected across the output terminals of said amplifying device.

5. Apparatus for measuring a four-pole parameter involving a current and a voltage at opposite pairs of terminals of said four-pole, comprising: means for supplying to a third pair of terminals said current or said voltage manifest at one of the pairs of terminals of said four-pole and also for supplying thereto the terminal voltage or terminal current respectively associated with said last-named voltage or current; means for supplying to said third pair of terminals from the other pair of terminals of said four-pole only the voltage or the current, respectively, at said other pair of terminals which is the remaining quantity involved in said parameter; said last-named means including means for deriving the difference between said last-named quantity and said associated terminal voltage or current, respectively, and also including means for supplying said difference quantity to said third pair of terminals, whereby said associated terminal voltage or current and the respective subtractive component of said difference quantity are canceled out at said third pair of terminals, leaving only the current and voltage involved in said four-pole parameter; and means for measuring said four-pole parameter as a two-terminal parameter at said third pair of terminals.

6. Apparatus for measuring a four-pole parameter involving current at one pair of terminals of said four-pole and voltage at the other pair of terminals of said four-pole comprising means for transferring said current and its associated terminal voltage from said one pair of terminals to a third pair of terminals, means for transferring to said third pair of terminals the difference between said voltage at said other pair of terminals and said associated terminal voltage at said one pair of terminals without changing the phase of either of said last-named voltages, and means for measuring said parameter as a two-terminal parameter at said third pair of terminals.

7. Apparatus for measuring the transfer impedance $$\frac{e_2}{i_1}$$

of a four-pole, where $e_2$ is the voltage across the output terminals of said four-pole and $i_1$ is the current supplied to the input terminals of said four-pole, comprising means for supplying said current $i_1$ and its associated terminal voltage $e_1$ to said input terminals of said four-pole, whereby said voltage $e_2$ is manifest across said output terminals of said four-pole, means for transferring the difference in voltage between said voltages $e_2$ and $e_1$ to an auxiliary pair of terminals, means for also transferring said voltage $e_1$ and said current $i_1$ to said auxiliary pair of terminals, and means for measuring the net voltage-current ratio $$\frac{e_2}{i_1}$$

at said auxiliary pair of terminals.

8. Apparatus for measuring the transfer admittance $$\frac{i_2}{e_1}$$

of a four-pole at an auxiliary pair of terminals, where $e_1$ is the voltage across the input terminals of said four-pole, said four-pole having an input terminal current $i_1$ and an output terminal current $i_2$, comprising means for supplying said current $i_1$ to said input terminals of said four-pole, means for combining said output terminal current $i_2$ and said input terminal current $i_1$, means for supplying said combined currents to one of an auxiliary pair of terminals, means for deriving the negative of said current $i_1$ and supplying said negative current $-i_1$ also to said one terminal of said auxiliary pair of terminals, means for supplying said voltage $e_1$ to said auxiliary pair of terminals and means for measuring the net current-voltage ratio $$\frac{i_2}{e_1}$$

at said auxiliary pair of terminals.

9. A circuit for measuring the gain of an amplifying device having input and output terminals which comprises: a unity voltage gain, zero phase-shift amplifier; an auxiliary pair of terminals; means interconnecting said auxiliary terminals, the output terminals of said unity gain amplifier, and said input terminals of said amplifying device in series circuit relationship, a current $i_1$ flowing through said series circuit; means for deriving from the input and output of said amplifying device a difference voltage equal to the voltage $e_2$ minus the voltage $e_1$, where $e_2$ and $e_1$ are the output and input terminal voltages, respectively, of said amplifying device, said last-named means supplying said difference voltage to the input terminals of said unity gain amplifier; means for deriving from the output of said unity gain amplifier a voltage equal to said difference voltage and having the same phase as said difference voltage, whereby the net voltage across said auxiliary terminals is the voltage $e_2$; a resistor of relatively small value connected across one pair of said amplifying device terminals; and means for measuring the net voltage-current ratio $$\frac{e_2}{i_1}$$

across said auxiliary pair of terminals.

References Cited in the file of this patent

UNITED STATES PATENTS

| | | |
|---|---|---|
| 1,684,403 | Mason | Sept. 18, 1928 |
| 2,569,691 | Roberts | Oct. 2, 1951 |
| 2,587,697 | Conrad | Mar. 4, 1952 |
| 2,704,826 | Wiegand | Mar. 22, 1955 |